United States Patent
Paschotta et al.

(10) Patent No.: US 6,834,064 B1
(45) Date of Patent: Dec. 21, 2004

(54) MODE-LOCKED THIN-DISK LASER

(75) Inventors: Ruediger Paschotta, Zurich (CH);
Juerg Aus Der Au, Zurich (CH);
Gabriel J Spuehler, Zurich (CH);
Ursula Keller, Zurich (CH)

(73) Assignee: Time-Bandwidth Products AG, Zürich (CH)

( * ) Notice: Subject to any disclaimer, the term of this patent is extended or adjusted under 35 U.S.C. 154(b) by 0 days.

(21) Appl. No.: 09/528,788

(22) Filed: Mar. 17, 2000

Related U.S. Application Data

(63) Continuation-in-part of application No. 09/456,338, filed on Dec. 8, 1999, now abandoned.

(51) Int. Cl.[7] .......................... H01S 3/113; H01S 3/098; H01S 3/10; H01S 3/13; H01S 3/04
(52) U.S. Cl. ............................ 372/30; 372/11; 372/21; 372/34; 372/18
(58) Field of Search ............................ 372/30, 11, 18, 372/21, 34, 36, 22, 41, 43, 70, 72, 98, 99, 35, 39, 50, 25

(56) References Cited

U.S. PATENT DOCUMENTS

| | | | | |
|---|---|---|---|---|
| 4,464,761 A | * | 8/1984 | Alfano et al. | 372/41 |
| 5,828,424 A | * | 10/1998 | Wallenstein | 348/760 |
| 5,987,049 A | * | 11/1999 | Weingarten et al. | 372/70 |
| 6,345,061 B1 | * | 2/2002 | Stingl et al. | 372/36 |
| 6,363,090 B1 | * | 3/2002 | Wintner et al. | 372/21 |

OTHER PUBLICATIONS

Kasamatsu et al, Laser–diode–pumped Nd:YAG active mirror laser, Applied Optics, Mar. 20, 1997, vol. 36, No. 9, pp. 1879–1881.*

A. Giesen, H. Hugel, A. Voss, K. Wittig, U. Brauch, H. Opower, Scalable Concept for Diode–Pumped Solid–State Lasers, Applied Physics B 58, 365–372 (1994).

Tadashi Kasamatsu and Hitoshi Sekita, Laser–diode–pumped Nd:YAG active–Mirror laser, Applied Optics, vol. 36, No. 9, Mar. 20, 1997.

M. Karszewski, U. Brauch, K. Contag, A. Giesen, I. Johannsen, C. Stewen, A. Voss, 100 W TEM00 Operation of Yb:YAG Thin Disc Laser with High Efficiency; 82/AMC3–1.

* cited by examiner

Primary Examiner—James Vannucci
Assistant Examiner—Armando Rodriguez
(74) Attorney, Agent, or Firm—Oppedahl & Larson LLP

(57) ABSTRACT

A pulsed solid-state thin-disk laser comprises an optical resonator and a solid-state laser gain medium placed inside the optical resonator. The laser gain medium is in the shape of a thin plate or layer with two end faces, the extension of the end faces being greater than a thickness of said plate or layer measured in a direction perpendicular to one of the end faces. One of the end faces comprises a cooling surface, via which the laser gain medium is cooled. A pumping source is provided for exciting the laser gain medium to emit electromagnetic radiation. The thin-disk laser further comprises means for passive mode locking placed inside the optical resonator. The mode-locking means are preferably a semiconductor saturable absorber mirror (SESAM). The laser offers a high average power, a good beam quality, short pulses and a high efficiency. Problems such as thermal lensing, Q-switching instabilities and damages of the mode-locking means are avoided. Moreover, the output power of the laser is scalable, i.e., may be increased without increasing the above-mentioned problems.

43 Claims, 6 Drawing Sheets

MODE-LOCKED THIN-DISK LASER

This application is a continuation-in-part of U.S. patent application Ser. No. 09/456,338, filed Dec. 8, 1999 now abandoned.

FIELD OF THE INVENTION

This invention relates to lasers and, more particularly, to mode-locked thin-disk lasers (also called active-mirror lasers) and to methods for generating pulsed laser radiation. The invention also relates to an apparatus for emitting pulsed electromagnetic radiation.

BACKGROUND OF THE INVENTION

Conventional solid-state lasers comprise a rod made of a solid-state laser gain material. The laser rod typically has the geometry of a cylinder, its longitudinal dimension (length) being larger than its transverse dimension (diameter). The laser gain material is optically excited (pumped) by light, e.g., from laser diodes, impinging in transverse direction upon the cylindrical surface or in longitudinal direction upon the end faces. The laser radiation is emitted in longitudinal direction and recirculated in a resonator cavity.

The laser rod must be cooled in order to avoid damage caused by heat absorbed from the pump light, especially in high-power lasers. In the conventional solid-state lasers described above, dissipated power is removed in transverse direction from the cylindrical surface of the laser rod, e.g., by a cooling liquid. Such transverse cooling leads to a transverse temperature gradient inside the laser rod, i.e., the temperature in the middle (on or near the axis) of the rod is significantly higher than on the surface of the rod. Due to the temperature dependence of the refractive index and to thermally induced mechanical stress, the refractive index of the gain material also varies in transverse direction and is generally higher in the middle of the rod. This results in "thermal lensing" or thermally induced birefringence which can cause a very detrimental degradation of the laser beam quality and efficiency losses.

In order to overcome the problem of thermal lensing, a concept called "thin-disk laser" or "active-mirror laser" has been proposed (cf. U.S. Pat. No. 5,553,088 by Brauch et al., "Laser Amplifying System"; A. Giesen et al., "Scalable Concept for Diode-Pumped High-Power Solid-State Lasers", Appl. Phys. B 58, 365–372, 1994; T. Kasamatsu and H. Sekita, "Laser-diode-pumped Nd:YAG active-mirror laser", Appl. Opt., Vol. 36, No. 9, 1879–1881, 1997; all incorporated herein by reference). The basic idea of this approach is a very thin laser-crystal disk, one surface of which is longitudinally pumped by laser diodes, whereas the other surface is mounted on a heat sink. If the thickness of the disk is smaller than the laser beam diameter, one obtains a nearly one-dimensional heat flow to the cooled surface. Therefore, a uniform pump intensity distribution can generate a temperature profile which is uniform in the transverse direction, which minimizes thermal-lensing effects. Nearly complete pump absorption can be achieved despite the small thickness of the disk by arranging multiple passes of the pump radiation through the disk, using appropriate pump optics. In continuous-wave (cw) operation, this concept has allowed to generate as much as 100 W output power in a diffraction-limited beam (M. Karszewski et al., "100 W $TEM_{00}$ operation of Yb:YAG thin disk laser with high efficiency", Conference on Advanced Solid-State Lasers, OSA Technical Digest Series (Optical Society of America, Washington D.C., 1998), p. 296, 1998), more than has been achieved with other laser concepts.

Lasers emitting short or ultrashort (in the sub-picosecond range) pulses are known in the art. A well-known technique for short or ultrashort pulse generation is mode locking. Mode locking is a coherent superposition of longitudinal laser-cavity modes. It is forced by a temporal loss modulation which reduces the intracavity losses for a pulse within each cavity-roundtrip time. This results in an open net gain window, in which pulses only experience gain if they pass the modulator at a given time. The loss modulation can be formed either actively or passively. Active mode locking is achieved, for instance, using an acousto-optic modulator as an intracavity element, which is synchronized to the cavity-roundtrip time. However, ultra-short-pulse generation relies on passive mode-locking techniques, because only a passive shutter is fast enough to shape and stabilize ultrashort pulses. Passive mode locking relies on a saturable absorber mechanism, which produces decreasing loss with increasing optical intensity. When the saturable-absorber parameters are correctly adjusted for the laser system, stable and self-starting mode locking is obtained.

Ultra-short passively mode-locked solid-state lasers often use Kerr-lens mode locking (KLM) (cf. U.S. Pat. No. 5,163,059 by Negus et al., "Mode-locked Laser Using Non-linear Self-focusing Element", incorporated herein by reference). In KLM, self-focusing of the laser beam due to the Kerr effect combined with either a hard aperture or a "soft" gain aperture produces a self amplitude modulation. Passive mode locking can also be achieved with semiconductor saturable absorber mirrors (SESAMs) (cf. U. Keller et al., "Semiconductor saturable absorber mirrors (SESAMs) for femtosecond to nanosecond pulse generation in solid-state lasers", Journal of Selected Topics in Quantum Electronics (JSTQE), Vol. 2, No. 3, 435–453, 1996, incorporated herein by reference). A SESAM is a nonlinear mirror inserted inside the laser cavity. Its reflectivity is higher at higher light intensities due to absorption bleaching obtained by using semiconductors as the nonlinear material. A SESAM typically consists of a bottom mirror, the saturable absorber structure and, optionally, an additional antireflection or reflecting coating on the top surface. To date, mainly continuous-wave (cw) or Q-swithced thin-disk lasers have been reported, although lasers emitting short or ultrashort pulses are important tools in a wide variety of applications in physics, chemistry, biology and medicine. German patent application No. 199 07 722 discloses a thin-disk laser mode locked by a Kerr-lens mode-locking mechanism, but points out that a SESAM would be unsuitable for a high-power thin-disk laser. There are mainly two problems which arise when one tries to insert a passive mode-locking device, especially a SESAM, into a thin-disk laser.

The first problem are Q-switching instabilities. An unwanted tendency for Q-switched mode locking (QML) is introduced by a saturable absorber in the laser cavity. This results from the fact that e.g. some increase of the intracavity pulse energy over the stationary value (caused maybe by a pump fluctuation) leads to stronger bleaching of the absorber and thus an increased net gain, which in effect causes an exponential growth of the pulse energy. This growth is suppressed if gain saturation limits the pulse energy in time. Solid-state lasers materials (and Yb:YAG in particular) have low laser cross-sections and thus weak gain saturation effects, so that Q-switching instabilities are often difficult to avoid. We have made a detailed investigation of this problem and found a number of counter-measures (C. Hönninger et al., "Q-switching stability limits of cw passive mode locking", J. Opt. Soc. Am. B 16, 46, 1999), which we also applied to the mode-locked Yb:YAG laser as described in this document.

The second problem is possible damage of the saturable absorber. This can be caused either by over-heating, or by non-thermal effects at high optical intensities, particularly if Q-switching instabilities lead to the generation of high-energy pulses. These damage problems can be critical in passively mode-locked high-power lasers, but in this document we show that they can be solved for thin-disk Yb:YAG lasers and do not prevent scaling to very high average powers.

SUMMARY OF THE INVENTION

It is therefore an object of this invention to provide a thin-disk laser which can be passively mode locked. The laser shall have a good beam quality (e.g., emit the fundamental $TEM_{00}$ mode), a high efficiency (e.g., 25% or more), and emit short pulses (in the picosecond range or shorter) with a high average power (e.g., 10 W and higher) and/or high pulse energy (e.g., 0.5 µJ or more). It is a further object of this invention to provide a method for generating short-pulsed laser radiation with a high average power, a good beam quality and a high efficiency. It is still a further object to provide an apparatus for emitting pulsed electromagnetic radiation.

The laser for emitting pulsed electromagnetic radiation according to the invention comprises:
an optical resonator;
a solid-state laser gain medium placed inside said optical resonator, said laser gain medium having two end faces, and at least one of said end faces comprising a cooling surface;
means for cooling said laser gain medium via said cooling surface;
means for exciting said laser gain medium to emit electromagnetic radiation; and
means for passive mode locking placed inside said optical resonator.

The method for generating pulsed laser radiation according to the invention comprises the steps of:
exciting a solid-state laser gain medium to emit electromagnetic radiation, said laser gain medium having two end faces, and at least one of said end faces comprising a cooling surface;
cooling said laser gain medium via said cooling surface;
recirculating said electromagnetic radiation in an optical resonator; and passively mode locking said electromagnetic radiation.

The laser according to the invention uses the thin-disk laser concept with its longitudinal cooling geometry. This has the advantage that thermal-lensing effects are reduced or suppressed. The absorption of the pump radiation can be made efficient by performing multiple passes of the pump radiation in the disk. In order to avoid reflections which could affect the mode-locking process, the disk is preferably wedge-shaped.

The thin disk is preferably made of Yb:YAG; this laser gain material offers a very good efficiency of typically 50% and allows the generation of very short pulses with durations even below 1 ps. Other possible laser gain materials are, e.g., Nd:YAG, Nd:YVO$_4$ (neodymium vanadate), or semiconductors.

A preferred embodiment of the laser according to the invention comprises a SESAM as the passive mode-locking means. A SESAM is a compact and simple device for mode locking, and allows for very short pulses. SESAM stands here for any other saturable absorber structures, which have sometimes been termed A-FPSA (Opt. Lett. 17, 505, 1992), SBR (Opt. Lett. 20, 1406, 1995), D-SAM (Opt. Lett. 21, 486, 1996), semiconductor doped dielectric layers (Opt. Lett. 23, 1766, 1998), or colored glass filters (Appl. Phys. Lett. 57, 229, (1990), for example. Any other saturable absorbers could be used which allow to adjust the operation parameters for stable mode locking (cf. C. Hönninger et al., "Q-switching stability limits of cw passive mode locking", J. Opt. Soc. Am. B 16, 46, 1999).

However, a saturable absorber in the laser cavity introduces an unwanted tendency for Q-switched mode locking (QML). The tendency for QML can be reduced by one or several of the following measures:

(a) high average intensity (=average power per mode area, e.g., 40 kW/cm$^2$), i.e., a high average power and/or a small mode area, in the laser gain medium;

(b) low repetition rate (e.g., lower than 50 MHz, preferably about 30 MHz), i.e., a long resonator cavity;

(c) strong saturation of the SESAM, i.e., an operation of the SESAM far above the saturation fluence $$F_{sat} \equiv E_{A,sat}/A_{SESAM},$$

where $E_{A,sat}$ is the saturation energy of the SESAM and $A_{SESAM}$ is the mode area on the SESAM (However, a strong saturation of the SESAM increases the risk of SESAM damage as well as a tendency for the laser to generate multiple circulating pulses, rather than a single pulse per round-trip time. One therefore preferably limits the ratio of the intracavity pulse energy to $E_{A,sat}$ to values smaller than 10, although higher values may be possible.);

(d) soliton mode locking, i.e., an operation with negative dispersion, which at the same time helps to achieve shorter pulses. (In C. Hönninger et al., "Q-switching stability limits of cw passive mode locking", J. Opt. Soc. Am. B 16, 46, 1999, it is explained how the interplay of soliton effects and gain filtering helps to suppress Q-switching instabilities.)

It should be noted that a suitably designed thin disk laser head (with a small laser-mode size in the gain medium) strongly reduces the QML tendency via measure (a), so that a strong SESAM saturation (measure (c)) is not necessarily required.

According to the invention, the problem of possible thermal SESAM damage is eliminated based on the fact that heating depends on the absorbed intensity, not power. This is because the thickness of the SESAM is smaller than the laser-mode area on the device. The thermal load on the SESAM can be reduced by using a "low-finesse" design with a low saturation fluence $F_{sat}$, which allows to use a larger mode area. Typical saturation fluences which do not cause any damages are in the range of 100 µJ/cm$^2$. Non-thermal SESAM damage is avoided by not operating the SESAM far above the critical saturation fluence. A passively mode-locked thin-disk laser may also be deliberately operated in the Q-switched mode-locked regime, where the maximum achieved pulse energy is considerably increased. For this purpose, a SESAM with higher modulation depth is used, or possibly a combination of several SESAMs (e.g., to distribute the heat load). Another possibility is to incorporate a Pockels cell and polarizing optics for cavity dumping. This allows to extract pulses with energies which are only slightly lower than the intracavity pulse energy, which can be very high in a mode-locked thin-disk laser.

The laser according to the invention offers the important advantage of power scalability. The output power can be varied by a factor q (e.g., q=2 for doubling the output power)

by multiplying the pump power as well as the mode areas on the thin disk and the SESAM by the same factor q. (It is well-known to the person skilled in the art how to design and construct laser cavities with suitable laser-mode sizes.) By following this scaling rule, the tendencies for thermal lensing, Q-switching instabilities and SESAM damage (thermal or non-thermal) do not increase, but remain approximately constant. In other words, the problems do not grow when scaling up power. The temperature excursion in the laser disk is not increased because the pump intensity remains unchanged. Residual transverse thermal gradients in the laser disk are reduced by scaling up the mode area, which just compensates the higher sensitivity of larger laser modes to lensing effects. The temperature excursion on the SESAM is not increased again because it is determined by the absorbed intensity which remains unchanged. Finally the tendency to Q-switching instabilities is not increased by the power scaling as described (for details see C. Hönninger et al., "Q-switching stability limits of cw passive mode locking", J. Opt. Soc. Am. B 16, 46, 1999). Consequently, the invention makes possible very high average powers (of 100 W and more), combined with good beam quality, high efficiency and short pulse durations.

Instead of or in addition to a saturable absorber, Kerr lens mode locking (KLM) may be applied in the laser according to the invention. In order to achieve even shorter pulse durations and self-starting mode locking, preferably both mode-locking techniques could be used in combination. The Kerr effect, e.g., in a glass plate or in the laser gain medium, is strong for high intracavity powers, which are achievable by the power scaling explained above.

Preferably, a glass plate (or a similar transparent medium) placed in the resonator cavity at an angle near the Brewster angle with respect to the laser-beam axis is used to enforce a linear polarization of the laser radiation. The same plate or another plate at a different location in the resonator cavity can be used as a nonlinear (Kerr) medium to exploit the effect of Kerr lens mode locking instead of or in addition to the action of the saturable absorber.

In the laser according to the invention, measures for introducing negative dispersion or dispersion compensation are preferably taken. Examples for dispersion-compensating means to be inserted into a laser-resonator cavity are:

- a Gires-Tournois interferometer (GTI) (cf. F. Gires, P. Toumois, "Interomètre utilisable pour la compression dimpulsions lumineuses moduleéds en fréquence", C. R. Acad. Sci. Paris, Vol. 258, 6112–6115, 1964);
- a pair of diffraction gratings (cf. E. B. Treacy, "Optical Pulse Compression with Diffraction Gratings, IEEE J. Quantum Electron., Vol. 5, 454–458, 1969);
- a pair of prisms (cf. R. L. fork et al., "Negative dispersion using pairs of prisms", Optics Letters, Vol. 9, 150–152, 1984);
- a chirped mirror (P. Laporta and V. Magni, "Dispersive effects in the reflection of femtosecond optical pulses from broadband dielectric mirrors", Applied Optics, Vol. 24, 2014–2020, 1985; R. Szipöcs et al., Opt. Lett. 19, 201, 1994; F. X. Kärtner et al., Opt. Lett. 22, 831, 1997), or another type of dispersive mirrors.

In the following, the effect of spatial hole burning (SHB) in the laser according to the invention is discussed. Because the laser gain medium is extremely thin in a thin-disk laser, the standing-wave pattern in the gain medium is wiped out only for a relatively large emission bandwidth. This has two consequences, a rather negative and a rather positive one:

If the laser is set up for the generation of relatively long pulses (of a few picoseconds in the case of a thin laser disk with a thickness of about 0.2 mm), the standing-wave pattern is not wiped out and inhomogeneous gain saturation deforms the gain spectrum. This favors a tendency for the generation of multiple pulses, which is a usually unwanted (because less stable) regime of operation.

If the pulses are shorter (about 0.5–1 ps), SHB somewhat flattens the gain spectrum. This effect allows for the generation of shorter pulses because the effective gain spectrum is broadened. The best effect is achieved if the thickness of the gain medium is approximately equal to the velocity of light in the gain medium, divided by two times the desired bandwidth of the pulses, which itself can be roughly a third of the gain bandwidth of the laser medium. (For soliton pulses, this effectively means that within the time of the pulse duration the pulse can propagate through about twice the thickness of the gain medium.) Indeed, this condition was approximately fulfilled in first experiments, and a pulse duration below 700 fs was achieved, which would probably be difficult to achieve without the support by the mentioned effect.

If the generation of longer pulses is desired, the above-mentioned instability caused by SHB can be removed or substantially reduced as follows. The laser cavity is designed such that the laser beam hits the thin-disk gain medium not only twice but four times during each round-trip in the standing-wave cavity. Two bounces are made with a certain angle with respect to normal incidence, and the other two bounces with a slightly different angle. The difference of angles has the effect that the periods of the induced standing-wave patterns in the gain medium are different. The angles of incidence should be chosen such that the resulting standing-wave pattern is largely smeared out near the side of the crystal opposite to the one with the reflective coating. Near the other side of the crystal there will still be a standing-wave pattern of significant contrast, but there is no more any undepleted inversion which could be utilized by any wave with a frequency within the amplification bandwidth of the material. Therefore, the above-mentioned instability does not occur even if the lasing bandwidth is quite small, i.e., quite long pulses are generated.

For a more quantitative description of the setup for reducing SHB-caused instabilities, note that for a single wave in the gain medium the period of the induced gain grating is $$\lambda/(2n \cdot \cos\alpha), \quad (1)$$

where $\lambda$ is the vacuum wavelength, n is the refractive index of the crystal, and $\alpha$ is the angle (in the crystal) relative to normal incidence. The above-mentioned condition means that the number of periods within one crystal thickness differs by 0.5 between the two waves:

$$[2nd \cdot (\cos\alpha_1 - \cos\alpha_2)]/\lambda = 0.5, \quad (2)$$

where $\alpha_1$ and $\alpha_2$ are the two different angles of incidence occuring for different bounces, and d is the thickness of the gain medium. As an example, we use the following numbers: d=0.22 mm, n=1.82, $\lambda$=1030 nm, $\alpha_1$=1°. We then meet the condition (2) for $\alpha_2$=2.3°. The optimum may actually be to use a slightly larger value (e.g., $\alpha_2$=2.6°) so that perfect elimination of the standing-wave pattern occurs not at the crystal surface but somewhat more inside the crystal. The exact values of the angles $\alpha_1$, $\alpha_2$ are not critical. SHB-caused instabilities can also be reduced using other values on the right-hand side of Eq. (2) such as 1.5, 2.5, . . . , and generally such values with which the standing-wave pattern is largely smeared out.

In order to reduce SHB-caused instabilities, even more than four bounces of the laser beam on the thin-disk gain medium with at least two different angles of incidence are possible. This could lead to an even better smearing out of the standing-wave pattern.

A disadvantage of the described setup for reducing SHB-caused instabilities is that the laser beam experiences the effect of the thermal lens four times rather than two times per round-trip. On the other hand, the thermal lens can be rather weak in a thin-disk laser head, and the doubled gain may be used to either lower the laser threshold or (with increased output coupler transmission) reduce the intracavity laser intensity.

The laser according to the invention is particularly well suited as a pump source for devices which do nonlinear frequency conversion, such as frequency doublers, sum FL frequency mixers, synchronously pumped optical parametric oscillators (OPOs), optical parametric amplifiers (OPAs), or optical parametric generators (OPGs). For example, OPOs allow to generate powerful femtosecond pulses at different wavelengths and with good wavelength tunability. An OPO potentially yields much shorter (e.g., 10–20 times shorter) pulses than the pump pulses. This may lead to pulsed sources with several tens of Watts of average power and less than 100 fs pulse duration. Optical parametric generators need quite high pump pulse energies, which can be provided by a laser according to the invention without further amplification, so that the extension of such a laser with a single nonlinear crystal for parametric generation can provide an efficient and powerful pulsed source which can possibly be tuned in a wide wavelength range. To reduce the necessary parametric gain and/or to narrow the optical spectrum of the generated output, an optical seed source may be used, effectively operating the crystal as an OPA.

An OPO consists of a similar cavity as a laser resonator cavity, but the gain in the OPO is generated in a nonlinear crystal (e.g., made of LBO or KTA) which is pumped with the pulses from the thin-disk laser. The nonlinear crystal of the OPO generates a signal wave, for which the OPO cavity is resonant, and a corresponding idler wave. (Alternatively, the OPO cavity may be resonant for the idler wave.) The circulating signal pulses are synchronized with the pump pulses. The wavelengths of signal and idler waves are determined by phase matching, which depends on the refractive indices of the nonlinear crystal, i.e., on the material, its temperature and the propagation directions. It has been shown (L. Lefort et al., Opt. Lett. 24 (1), 28, 1999) that the pulses generated by an synchronously pumped OPO can be more than 10 times shorter than the pump pulses. Thus the combination of a passively mode-locked thin-disk laser according to the invention and a synchronously pumped OPO is a way towards the generation of pulses with more than 10 W average power and durations far below 1 ps, with the additional advantages of broad tunability and diode pumping. Other laser sources which could serve as OPO pump sources with similar specifications are presently not known.

In particular, the laser according to the invention can be combined with an OPO and a frequency doubler, a sum frequency mixer, an optical parametric generator (OPG) or an optical parametric amplifier (OPA). Such an apparatus could be used for generating high-power pulsed red, green and blue light, e.g., for color displays.

All the mentioned devices for nonlinear wavelength or frequency conversion of the output of the laser according to the invention require that phase matching in the nonlinear crystal is achieved in some way. (For a frequency doubling crystal, for example, phase matching means that the phase velocities of pump wave and second-harmonic wave are made identical.) There are two basic ways to achieve phase matching, called critical and noncritical phase matching, respectively:

(i) "Critical phase matching" means that one operates the nonlinear crystal at a fixed temperature, e.g., at room temperature, and adjusts the propagation angle of the beams in the crystal with respect to the principal axes of the crystal so that phase matching is obtained. (The necessary propagation angle can be calculated by a person skilled in the art.) Because the tolerance for the propagation angle is typically quite small, the beam divergence in the nonlinear crystal must be small, which prevents one from strongly focussing the beams in the crystal.

(ii) "Noncritical phase matching" means that the propagation direction is chosen so that the propagation angle is far less important; this is obtained, e.g., for propagation along one of the principal axes of the crystal. Phase matching is then achieved by controlling the temperature of the crystal, which is for this purpose, e.g., mounted in a temperature-controlled oven. The beam divergence can then be strong, so that strong focussing of the beams in the crystal can be used.

For noncritical phase matching, much higher peak powers are required to obtain good efficiency of the nonlinear process, because the beams can not be strongly focussed, as explained above. Noncritical phase matching is then often the only option. The laser according to the invention, however, allows to generate very high peak powers, because of the high average power and also the much shorter pulse duration (<1 ps) compared to typical high-power mode-locked lasers (>10 ps) known from the state of the art. Indeed the experiments with the laser according to the invention already resulted in well over 50% conversion efficiency in a critically phase-matched LBO crystal for second-harmonic generation at room temperature, generating green light with as much as 8 W of average power. (For laser pulses with, e.g., 10 ps duration and the same average power (15 W), the conversion efficiency for this process in LBO would be expected to be in the order of 10% only.) This shows that the laser according to the invention is very suitable as a pump source for efficient nonlinear wavelength converters based on critical phase matching (rather than noncritical phase matching). The main advantage of this is that the nonlinear crystal can be operated at constant temperature (possibly not even requiring active temperature control), which is particularly important for tunable parametric devices (e.g., optical parametric oscillators or optical parametric generators) because very fast tuning of the output wavelengths in wide ranges is then possible by changing the propagation angle in the nonlinear crystal rather than the crystal temperature, which inherently needs much more time to be changed.

DESCRIPTION OF THE PREFERRED EMBODIMENTS

Figure 1:
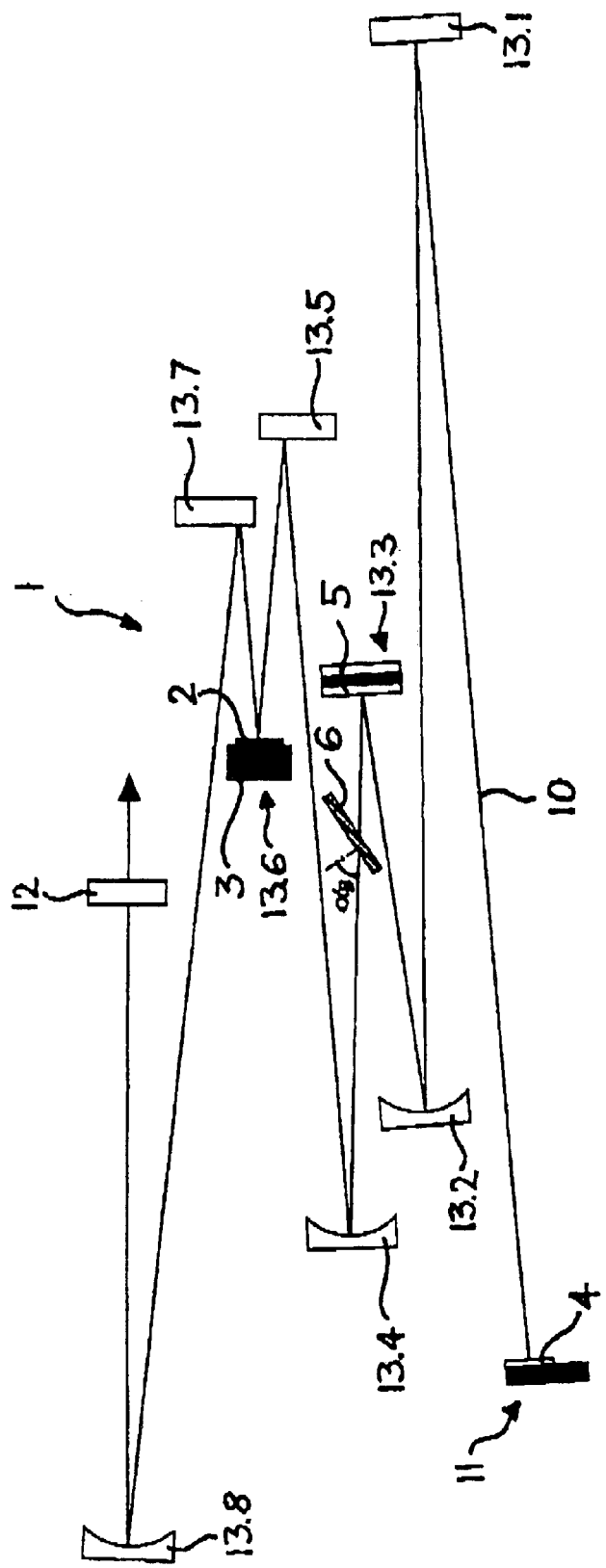
FIG. 1 is a schematic top plan view of a preferred embodiment of a laser according to the invention.

FIG. 1 shows a schematic, simplified illustration of a laser according to the invention. The laser comprises an optical resonator 1 delimited by a first reflective element 11 and a second reflective element 12 for reflecting laser radiation 10. In the preferred embodiment of FIG. 1, the first reflective element 11 is a semiconductor saturable absorber mirror (SESAM) device 4 for passively mode locking the laser; it is described below with reference to FIG. 3. In other embodiments, the first reflective element 11 could be, e.g., a dielectric mirror. The second reflective element 12 may be, e.g., a partially reflecting outcoupling dielectric and/or metallic mirror.

The resonator 1 shown in FIG. 1 is multiply folded by several folding mirrors 13.1–13.8. Their radii are, e.g., the following: $R_1=R_3=R_5=R_6=R_7=\infty$; $R_2=R_8=1.5$ m; $R_4=1$ m. The total length of the geometric path in the resonator 1 in this example is 10 m, corresponding to a repetition rate of 15 MHz. The lengths of the portions between the folding mirrors 13.1–13.8 may be calculated by comparison with FIG. 1 since FIG. 1 shows the lengths of the portions in a correct scale. Of course, many other laser resonator designs are possible for the laser according to the invention (cf. FIG. 7).

A thin-disk laser head comprising a thin-disk solid-state laser gain medium 2 mounted on cooling means 3 is placed inside the optical resonator 1. The thin-disk laser head simultaneously acts as a folding mirror 13.6 and is described below with reference to FIG. 2. Alternatively, the thin-disk laser head could be used as an end mirror 11 in the resonator cavity 1. For reasons of clarity, means for exciting the laser gain medium 2 are not drawn in FIG. 1 and are discussed with reference to FIG. 2.

The laser of FIG. 1 still further comprises a Gires-Tournois interferometer (GTI) 5 as a dispersion-compensating means. The GTI 5 simultaneously acts as a folding mirror 13.3. An optional glass plate 6 is placed inside the optical resonator 1 and oriented such that the angle of incidence of the laser beam 10 is equal to the Brewster angle (XB in order to obtain a linear polarization of the laser beam 10. The glass plate 6 could simultaneously be used for Kerr lens mode locking (KLM). Alternatively, the Kerr effect needed for KLM could be provided by an additional plate, by the laser gain medium 2 or by the GTI 5.

Figure 2:
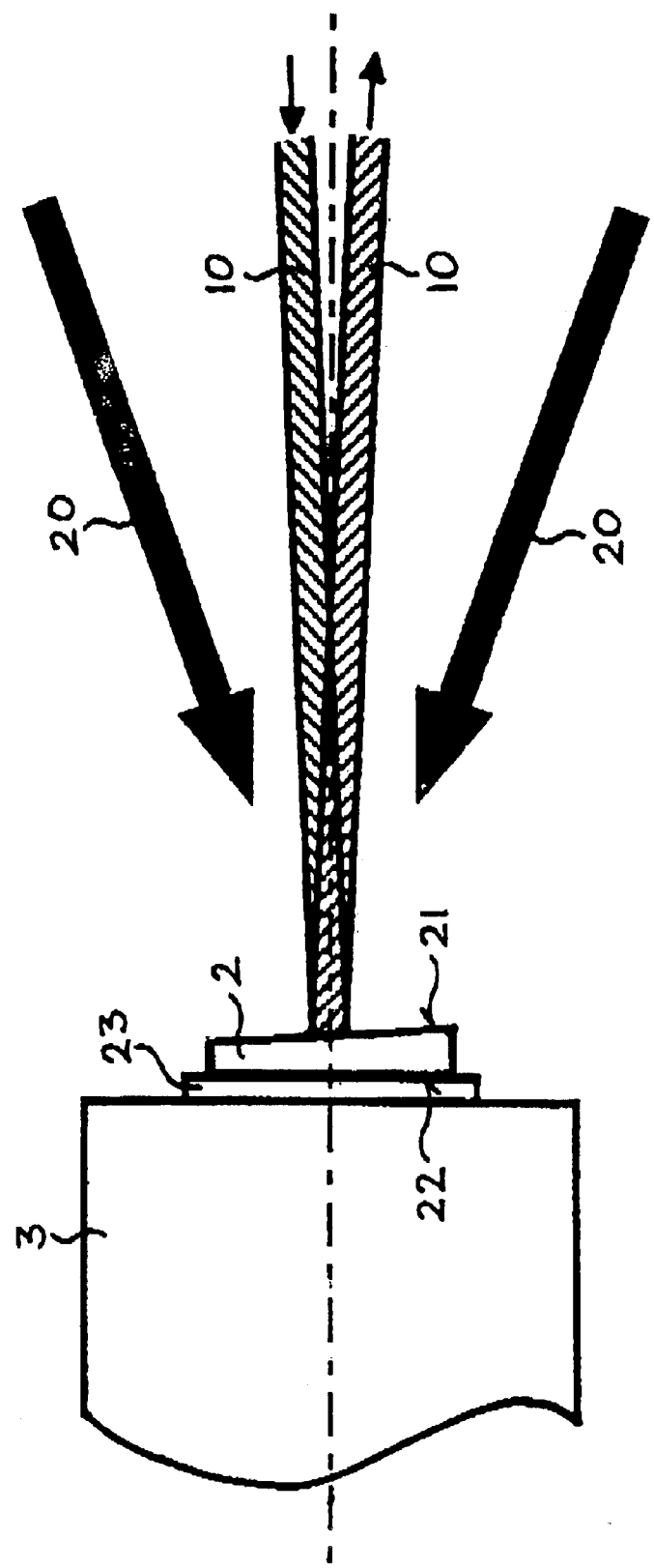
FIG. 2 is a schematic cross-section through a thin-disk laser gain medium mounted on a heat sink used in a preferred embodiment of the laser according to the invention.

FIG. 2 shows a schematic cross-section through a thin-disk laser head usable for a preferred embodiment of the laser according to the invention. A laser gain medium 2 has the shape of a thin disk and is preferably an Yb:YAG crystal with a thickness of about 0.2 mm. The thin disk 2 is mounted via a rear surface 22 on a cooling element 3, e.g., a water-cooled copper element. Between the thin disk 2 and the cooling element 3, there may be an indium foil 23 for mounting the thin disk 2 on the cooling element 3, for ensuring a good thermal contact between the thin disk 2 and the cooling element 3, and for enhancing the reflectivity of the rear surface 22. In order to avoid reflections which could affect the mode-locking process, the thin disk 2 is preferably slightly wedge-shaped. (For reasons of clarity, the wedge shape is strongly exaggerated in FIG. 2; typical wedge angles are about 0.1°.) The laser gain medium 2 is preferably optically pumped by light 20 emitted, e.g., by a laser diode (not drawn) and impinging on a front surface 21 of the thin disk 2. The front surface 21 of the thin disk 2 is preferably provided with an antireflection (AR) coating, the rear surface 22 with a high-reflection (HR) coating. A laser beam 10 impinging under a small angle of incidence on the front surface 21 of the thin disk 2 is amplified and reflected by the thin disk 2. In an other embodiment, where the thin disk 2 is used as an end mirror 11 in the resonator cavity 1, the angle of incidence could be zero (normal incidence).

Figure 3:
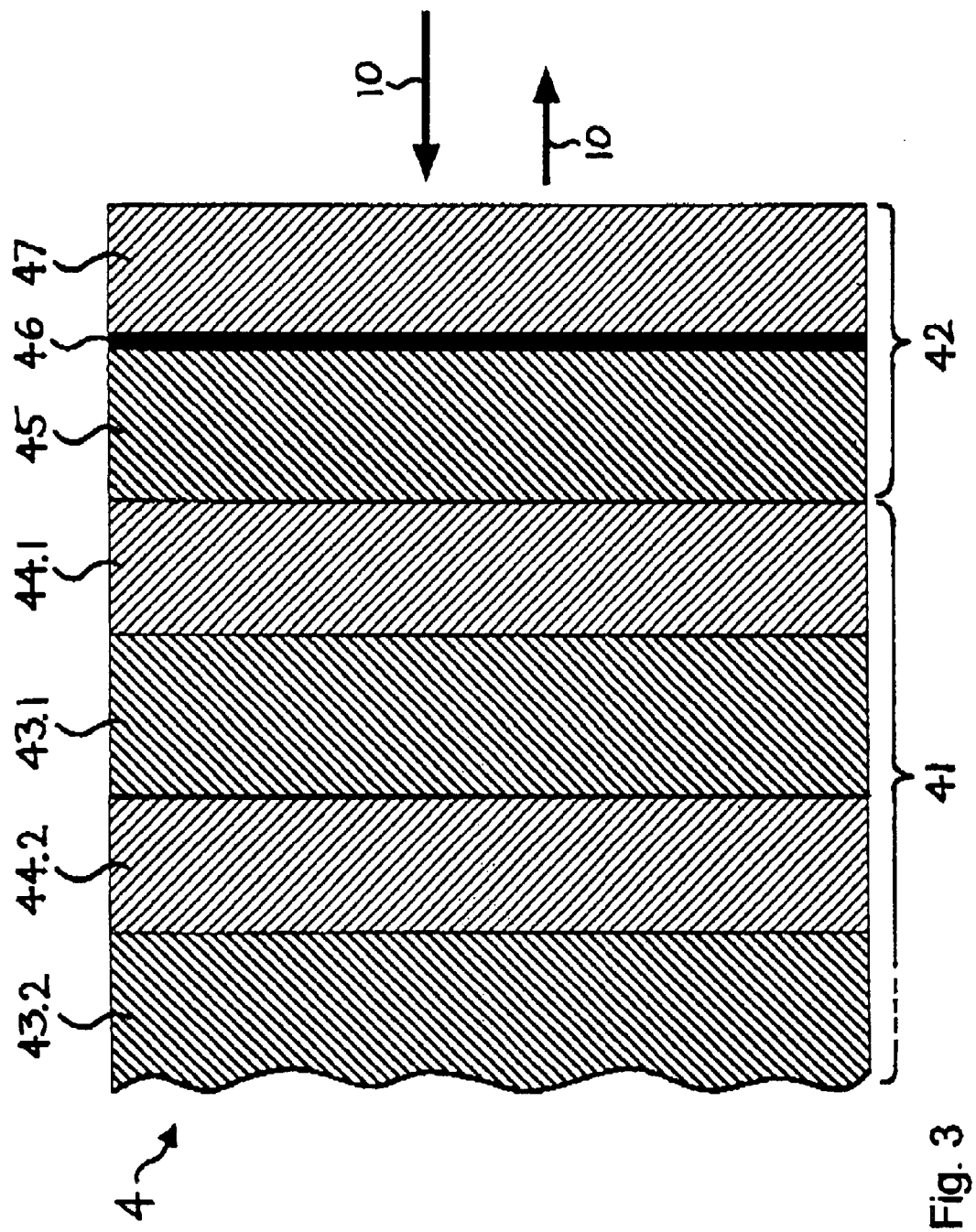
FIG. 3 is a schematic cross-section through a semiconductor saturable absorber mirror used in a preferred embodiment of the laser according to the invention.

FIG. 3 shows a schematic cross-section through a SESAM 4 used in a preferred embodiment of the laser according to the invention. A laser beam which is reflected by the SESAM 4 is sketched as an arrow 10. The SESAM 4 consists of a bottom mirror 41 and a saturable absorber structure 42. The bottom mirror 41 is typically a Bragg mirror, i.e., a stack of, e.g., 50 semiconductor and/or dielectric quarter-wave layers 43.1, 43.2, . . . , 44.1, 44.2, . . . on a substrate (not shown), wherein low-refractive-index layers 43.1, 43.2, . . . and high-refractive-index layers 44.1, 44.2, . . . alternate with each other. The quarter-wave layers of the bottom mirror 41 consist of, e.g., AlAs 43.1, 43.2, . . . (n=2.94 at $\lambda$=1030 nm) and GaAs (n=3.50 at $\lambda$=1030 nm) 44.1, 44.2, . . . . The saturable absorber structure 42 comprises a first AlAs structure 45 with a thickness of 85 nm, an InGaAs absorber layer 46 with a thickness of 8 run, and a GaAs spacer layer 47 with a thickness of 71 nm. Of course, a person skilled in the art is able to design other SESAMs 4.

Figure 4:
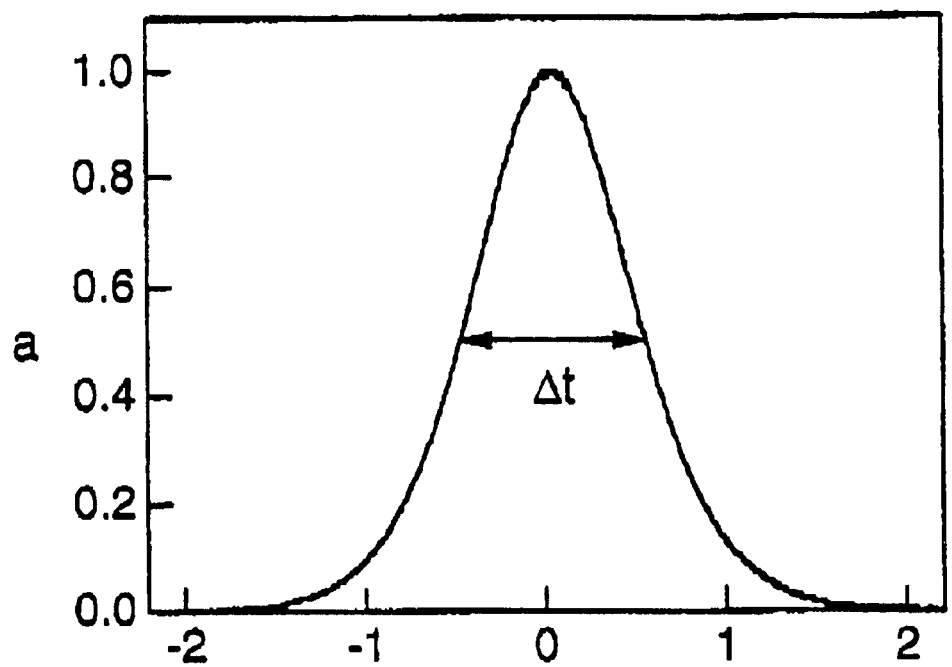
FIG. 4 is a graphical representation of the autocorrelation function versus time for an Yb:YAG laser according to the invention.
Figure 5:
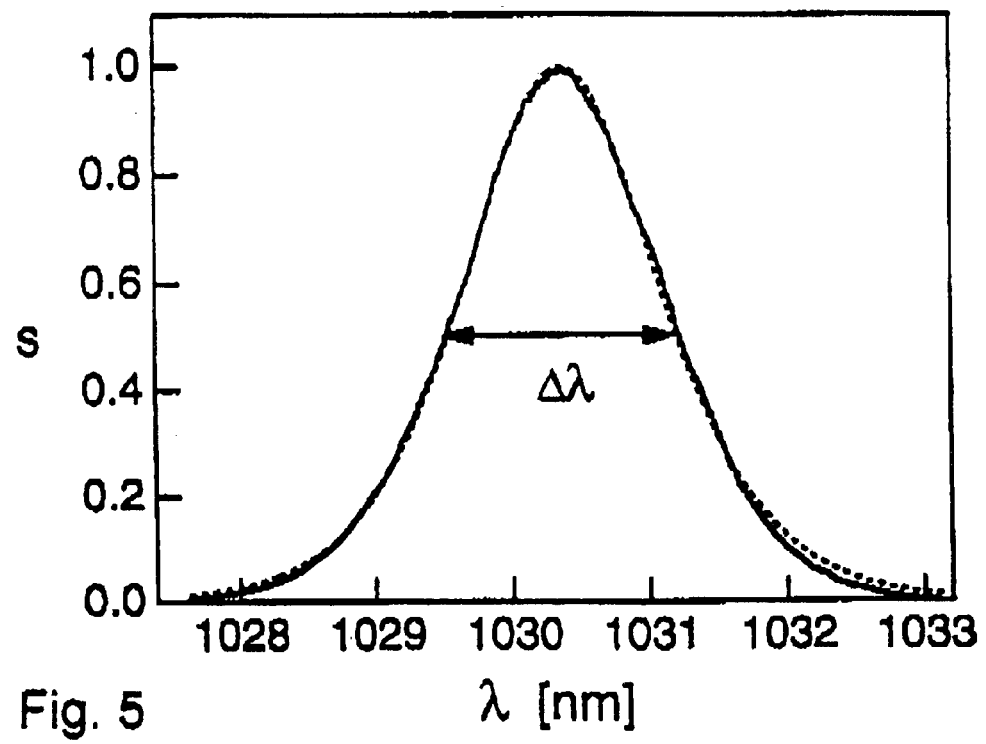
FIG. 5 is a graphical representation of the optical spectrum versus the optical wavelength for the measurement of FIG. 4.

Some experimental characteristics of the laser of FIG. 1 with a laser gain medium 2 as in FIG. 2 and a semiconductor saturable absorber mirror 4 as in FIG. 3 are presented in FIGS. 4 and 5. The autocorrelation a and the optical spectrum s, respectively, are drawn in full lines; the dashed lines are corresponding fits for soliton pulses. From the autocorrelation a, the pulse width can be determined; the pulse width is the full width at half maximum times a correction factor which depends on the form of the curve. For the autocorrelation a of FIG. 4, the correction factor is 0.648, and we obtain a pulse width of 680 fs. The optical spectrum s, shown in FIG. 5, indicates that the average output wavelength is 1030.3 nm.

Figure 6:
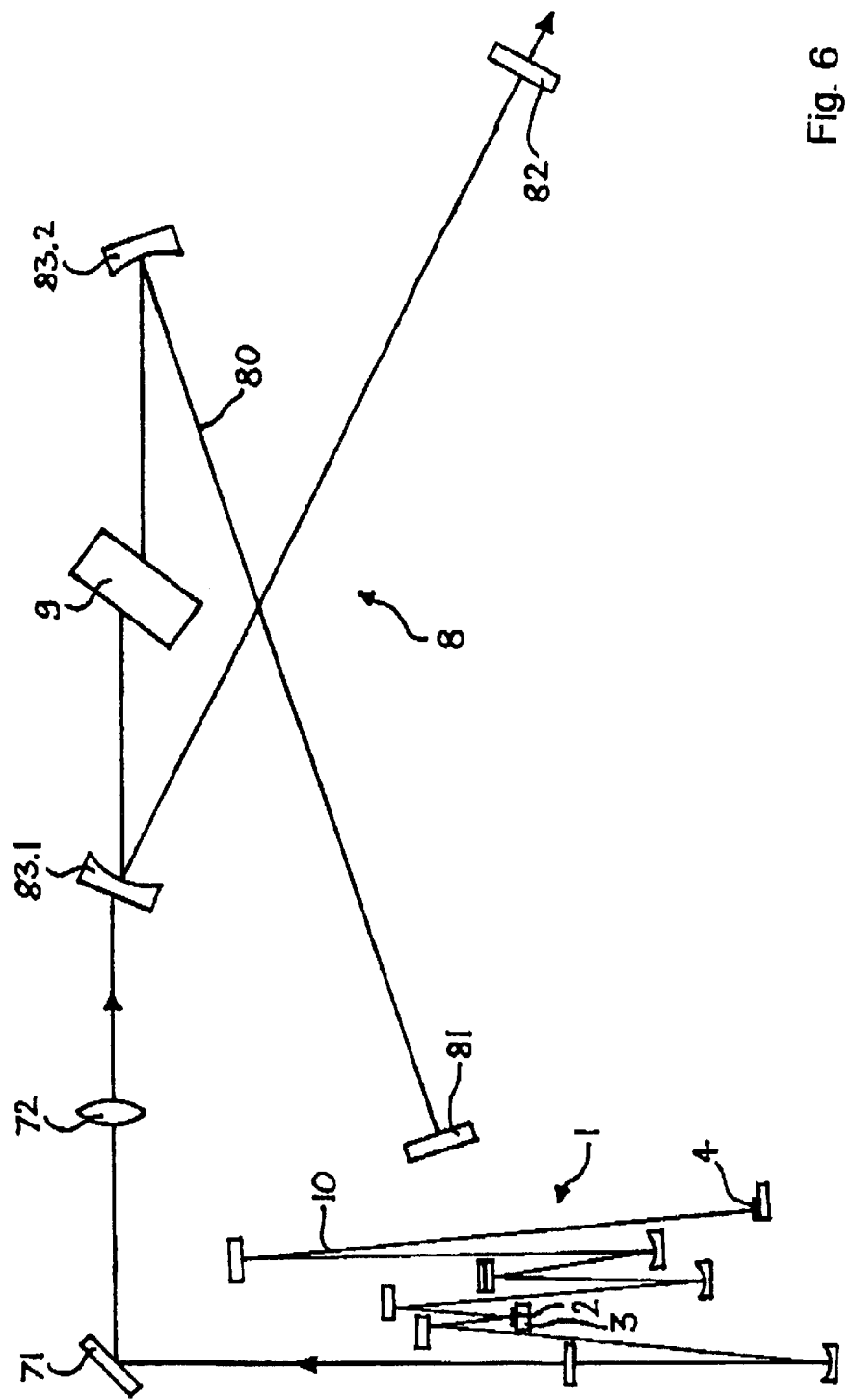
FIG. 6 is a schematic top plan view of an apparatus for optical frequency conversion according to the invention.

FIG. 6 shows a schematic, simplified illustration of an apparatus for optical frequency conversion according to the invention. It comprises a thin-disk laser according to the invention (left-hand side of FIG. 6) and a synchronously pumped optical parametric oscillator (OPO; right-hand side of FIG. 6). The thin-disk laser may be, e.g., the one shown in FIG. 1, with a resonator cavity 1 comprising a thin-disk disk gain medium 2 mounted on a cooling element 3, and a SESAM 4. An exemplified embodiment of an OPO cavity 8 is delimited by a first reflective element 81 and a second reflective element 82, and is folded by two, e.g., curved, folding mirrors 83.1, 83.2. An optically nonlinear element 9, e.g., an LBO crystal, is placed inside the OPO cavity 8. Phase matching is achieved either by adjusting the propagation angle of the beams in the crystal, or by controlling the crystal temperature, e.g., with an oven (not shown). The nonlinear element 9 emits a signal wave with a signal wavelength of, e.g., 1900 nm, and an idler wave with an idler wavelength of, e.g., 2250 nm; the common path of both signal and idler wave is referenced by the number 80. The mirrors 81 and 83.1, 83.2 have a high reflectivity for the signal wave and a low reflectivity for the idler wave. The second reflective element 82 is partially reflective (e.g., R=90%) for the signal wave and has a low reflectivity for the idler wave. The path length in the OPO resonator cavity 8 is the same as in the laser resonator cavity 1, e.g., 10 m. The laser radiation is incoupled into the OPO resonator cavity 8 by means of, e.g., a mirror 71 and a lens 72. Of course, many other OPO resonator designs are possible for the apparatus according to the invention.

Figure 7:
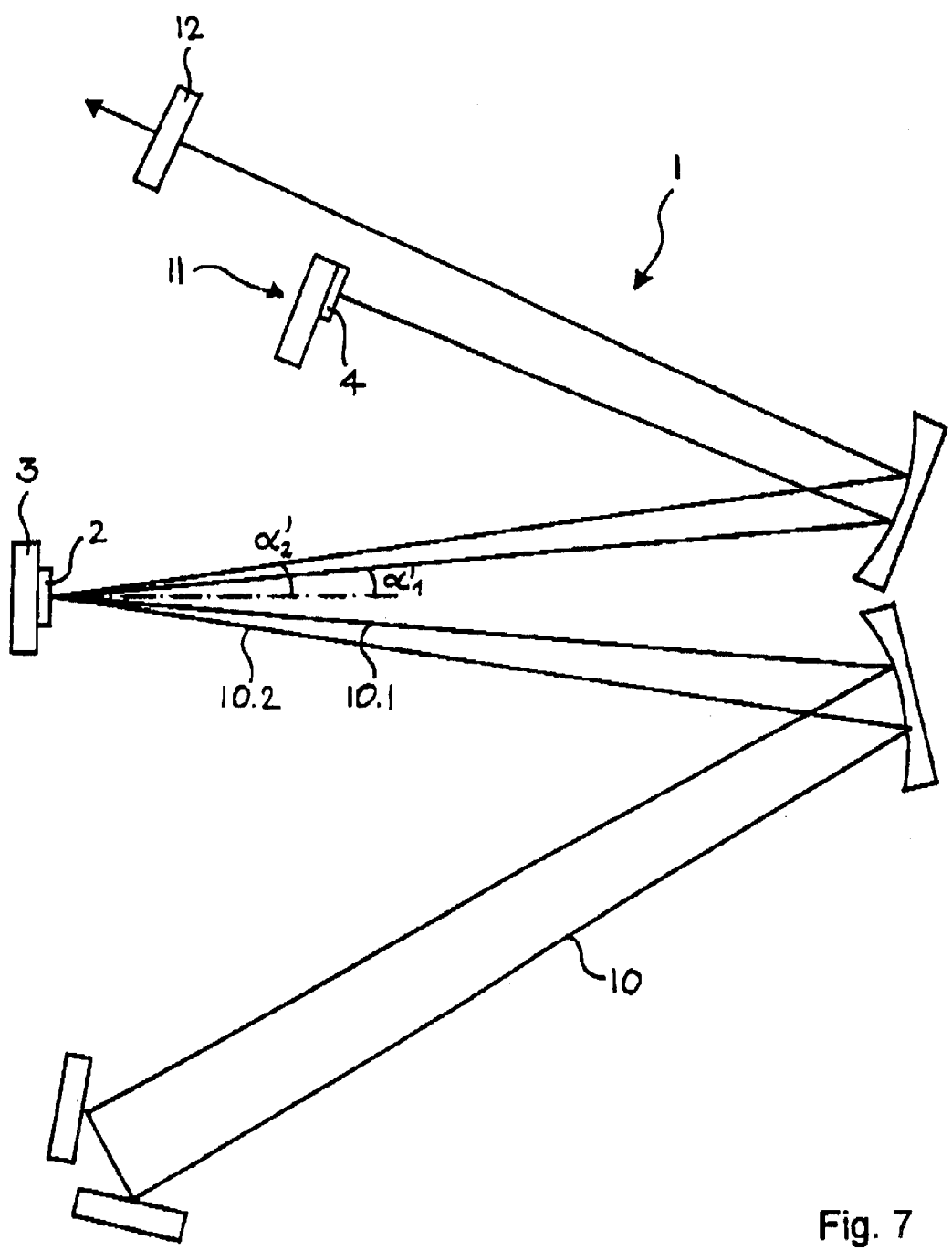
FIG. 7 is a schematic top plan view of an embodiment of a laser according to the invention wherein SHB-caused instabilities are recuced.

FIG. 7 is a schematic top plan view of an embodiment of a laser according to the invention wherein SHB-caused instabilities are eliminated or substantially recuced. This embodiment is especially well suited for the generation of longer pulses. The reduction of instabilities is achieved by a design of the laser resonator 1 wherein the laser beam 10 hits the thin-disk gain medium 2 not only twice (as, e.g., in the embodiment of FIG. 1) but four times during each round-trip in the standing-wave resonator. Two bounces 10.1 are made with a first angle $\alpha_1'$ with respect to normal incidence (e.g., $\alpha_1'=1.8°$), and the other two bounces 10.2 with a second angle $\alpha_2'$ (e.g., $\alpha_2'=4.2°$) which is slightly different from the first angle $\alpha_1'$. The difference of angles has the effect that the periods of the induced standing-wave patterns in the gain medium 2 are different. (It should be noted that the angles $\alpha_1'$ and $\alpha_2'$ in FIG. 7 are the angles of incidence in air and are thus not identical with the angles $\alpha_1$ and $\alpha_2$ in Eq. (2) which are the angles of incidence in the laser gain medium 2. The angles $\alpha_1$ and $\alpha_1'$ or the angles $\alpha_2$ and $\alpha_2'$, respectively, are related by Snell's law of refraction.)

Numerous other embodiments may be envisaged, without departing from the spirit and scope of the invention.

What is claimed is:

1. A laser for emitting pulsed electromagnetic radiation, said laser comprising:
   an optical resonator;
   a solid-state laser gain medium said solid-slate laser gain medium being placed inside said optical resonator,
   said laser gain medium having two end faces, and at least one of said end aces comprising a cooling surface;
   means for cooling said laser gain medium via said cooling surface;
   means for exciting said laser gain medium to emit electromagnetic radiation; and
   means for passive mode locking comprising a saturable absorber placed inside said optical resonator, such that when said laser gain medium is excited by said exciting means, pulsed laser radiation is caused to propagate within said optical resonator;
   wherein at least one of said end faces is provided with means for reflecting said emitted electromagnetic radiation.

2. The laser according to claim 1, wherein said laser gain medium is in the shape of a thin plate or layer with two end faces, the extension of said end faces being greater than a thickness of said plate or layer measured essentially in a direction perpendicular to one of said end faces.

3. The laser according to claim 1, wherein said reflecting means comprises a dielectric coating.

4. The laser according to claim 1, wherein said laser gain medium is selected from the group consisting of YbYAG, NdYAG, NdYVO4, and a semiconductor material.

5. The laser according to claim 1, wherein said laser gain medium has a thickness such that the effect of spatial hole burning supports the generation of short pulses.

6. The laser according to claim 1, wherein said optical resonator is designed such that said emitted electromagnetic radiation hits said laser gain medium twice during each round-trip in said optical resonator.

7. The laser according to claim 1, wherein said optical resonator is designed such that said emitted electromagnetic radiation hits said laser gain medium more than two times during each round-trip in said optical resonator, whereby at least two hits with different angles of incidence occur such that a standing-wave pattern in said laser gain medium is at least partially smeared out.

8. The laser according to claim 1, wherein said saturable absorber is a semiconductor saturable absorber mirror device.

9. The laser according to claim 1, further comprising means for introducing negative dispersion or dispersion compensation placed inside said optical resonator.

10. The laser according to claim 9, wherein said dispersion-compensating means is a Gires-Toumois interfromneter, a pair of diffraction gratings, a pair of prisms, or a dispersive mirror.

11. The laser according to claim 1, wherein said optical resonator has a length which is designed in a manner that pulsed electromagntic radiation at a repetition rate lower than 100 MHz is emitted.

12. The laser according to claim 1, wherein said exciting means comprises an electromagnetic-radiation source.

13. The laser according to claim 1, further comprising means for cavity dumping.

14. The laser according to claim 1, further comprising means for Q-switched mode locking.

15. An apparatus for emitting pulsed electromagnetic radiation, said apparatus comprising a laser, said laser comprising
   an optical resonator;
   a solid-state laser gain medium, said solid state laser gain medium being placed inside said optical resonator,
   said laser gain medium having two end faces, and at least one of said end faces comprising a cooling surface;
   means for cooling said laser gain medium via said cooling surface;
   means for exciting said laser gain medium to emit electromagnetic radiation; and
   means for passive mode locking comprising a saturable absorber placed inside said optical resonator, such that when said laser gain medium is excited by said means, pulsed laser radiation is caused to propagate within said optical resonator,
   the apparatus further comprising frequency-conversion means for an optically nonlinear frequency conversion of electromagnetic radiation emitted by said laser.

16. The apparatus according to claim 15, wherein said frequency-conversion means comprises at least one of the following; a synchronously pumped optical parametric oscillator (OPO), a frequency doubler, a sum frequency mixer, an optical parametric generator (OPG), and an optical parametric amplifier (OPA).

17. The apparatus according to claim 16, wherein said frequency-conversion means comprises a synchronously pumped optical parametric oscillator (OPO) and a frequency doubler, a sum frequency mixer, an optical parametric generator (OPO) or an optical parametric amplifier (OPA), for generating pulsed red, green and blue light.

18. The apparatus according to claim 15 wherein said frequency-conversion means comprises an optically nonlinear crystal with defined principal axes, said apparatus further comprising means for adjusting the propagation angle of said laser radiation in said crystal with respect to said principal axes in order to obtain phase matching of the nonlinear conversion process.

19. A method for generating pulsed laser radiation, comprising the steps of:
  exciting a solid-state laser gain medium to emit electromagnetic radiation, said laser gain medium having two end faces, and at least one of said end faces comprising a cooling surface;
  cooling said laser gain medium via said cooling surface;
  recirculating said electromagnetic radiation in an optical resonator; and
  passively mode locking said electromagnetic radiation using a saturable absorber;
  wherein said electromagnetic radiation in said optical resonator is cavity dumped.

20. The method according to claim 19, wherein said electromagnetic radiation is mode locked by a saturable absorber and/or by Kerr lens mode locking.

21. The method according to claim 19, wherein negative dispersion is introduced to inside said optical resonator.

22. The method according to claim 19, wherein pulsed electromagnetic radiation is emitted at a repetition rate lower than 100 MHz, and preferably lower than 50 MHz.

23. The method according to claim 19, wherein said laser gain medium is excited by electromagnetic radiation.

24. The method according to claim 19, wherein the thickness of the gain medium is chosen such that the effect of spatial hole burning supports the generation of short pulses.

25. The method according to claim 19, wherein said emitted electromagnetic radiation hits said laser gain medium twice during each round-trip in said optical resonator.

26. The method according to claim 19, wherein said emitted electromagnetic radiation hits said laser gain medium more than two times during each round-trip in said optical resonator, whereby at least two bits with different angles of incidence occur such that a standing-wave pattern in said laser gain medium is at least partially smeared out.

27. The method according to claim 19, wherein said electromagnetic radiation in said optical resonator is Q-switched mode locked, preferably by using a saturable absorber with a large modulation depth.

28. A method for generating pulsed electromagnetic radiation, said method comprising the steps of generating laser radiation by:
  exciting a solid-state laser gain medium to emit electromagnetic radiation, said laser gain medium having two end faces, and at least one of said end faces comprising a cooling surface;
  cooling said laser gain medium via said cooling surface;
  recirculating said electromagnetic radiation in an optical resonator;
  passively mode locking said electromagnetic radiation using a saturable absorber; and
  optically nonlinearly converting the frequency of said laser radiation.

29. The method according to claim 28, wherein the frequency of said laser radiation is converted by one or more of an optical parametric oscillator (OPO), a frequency doublers a sum frequency mixer, an optical parametric generator (OPG), and an optical parametric amplifier (OPA).

30. The method according to claim 29, wherein said laser radiation is converted by an optical parametric oscillator (OPO) and by a frequency doubler, a sum frequency mixer, an optical parametric generator (OPG) or an optical parametric amplifier (OPA), and thus pulsed red, green and blue light is generated.

31. The method according to claim 28, wherein the frequency is converted in an optically nonlinear crystal with defined principal axes, and phase matching of the nonlinear conversion process is obtained by adjusting the propagation angle of said laser radiation in said crystal with respect to said principal axes.

32. A method for generating pulsed electromagnetic radiation and for varying, by a defined scaling factor, the output power of said pulsed electromagnetic radiation, said method comprising the steps of
  exciting, with an exciting power, a solid-state laser gain medium to emit electromagnetic radiation, said laser gain medium having two end faces, and at least one of said end faces comprising a cooling surface;
  cooling said laser gain medium via said cooling surface;
  recirculating said electromagnetic radiation in an optical resonator; and
  passively mode locking said electromagnetic radiation using a saturable absorber,
  and further comprising the steps of:
    varying essentially by said scaling factor the exciting power,
    varying essentially by said scaling factor the area illuminated by said electromagnetic radiation in said laser gain medium; and
    varying essentially by said scaling factor the area illuminated by said electromagnetic radiation on said mode-locking means.

33. The method according to claim 32, wherein said solid state gain medium is excited by pumping electromagnetic radiation, and wherein the exciting power is a pump power of said pumping electromagnetic radiation.

34. A laser for emitting pulsed electromagnetic radiation, said laser comprising:
  optical resonator,
  a solid-state laser gain medium, said solid-state laser gain medium being placed inside said optical resonator,
  said laser gain medium having two end faces, and at least one of said end faces comprising a cooling surface;
  means for cooling said laser gain medium via said cooling surface;
  means for exciting said laser gain medium to emit electromagnetic radiation; and
  means for passive mode locking comprising a saturable absorber placed inside said optical resonator, such that when said laser gain medium is excited by said exciting means, pulsed laser radiation is caused to propagate within said optical resonator;
  further comprising means for cavity dumping.

35. A method for generating pulsed laser radiation, comprising the steps of:
  exciting a solid-state laser gain medium to emit electromagnetic radiation, said laser gain medium having two end faces, at least one of said end faces comprising a cooling surface, and at least one of said end faces being provided with means for reflecting said emitted electromagnetic radiation;
  cooling said laser gain medium via said cooling surface;
  recirculating said electromagnetic radiation in an optical resonator, and passively mode locking said electromagnetic radiation using a saturable absorber.

36. The method according to claim 35, wherein said electromagnetic radiation is mode locked by a saturable absorber and/or by Kerr lens mode locking.

37. The method according to claim 35, wherein negative dispersion is introduced to inside said optical resonator.

38. The method according to claim 35, wherein pulsed electromagnetic radiation is emitted at a repetition rate lower than 100 MHz, and preferably lower than 50 MHz.

39. The method according to claim 35 wherein said laser gain medium is excited by electromagnetic radiation.

40. The method according to claim 35, wherein the thickness of the gain medium is chosen such that the effect of spatial hole burning supports the generation of short pulses.

41. The method according to claims 35, wherein said emitted electromagnetic radiation hits said laser gain medium twice during each round-trip in said optical resonator.

42. The method according to claim 35, wherein said emitted electromagnetic radiation bits said laser gain medium more than two times during each round-trip in said optical resonator, whereby at least two hits with different angles of incidence occur such that a standing-wave pattern in said laser gain medium is at least partially smeared out.

43. The method according to claim 35, wherein said electromagnetic radiation in said optical resonator is Q-switched mode locked, preferably by using a saturable absorber with a large modulation depth.

* * * * *